United States Patent
Chen et al.

(10) Patent No.: US 9,864,691 B1
(45) Date of Patent: *Jan. 9, 2018

(54) DELETION INDICATION IMPLEMENTATION BASED ON INTERNAL MODEL

(71) Applicant: EMC IP Holding Company LLC, Hopkinton, MA (US)

(72) Inventors: Jeegn Chen, Shanghai (CN); James O. Pendergraft, Raleigh, NC (US); Norman D. Speciner, Medway, MA (US); Yue Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/105,608

(22) Filed: Dec. 13, 2013

(51) Int. Cl.
| | |
|---|---|
| *G06F 12/06* | (2006.01) |
| *G06F 12/0891* | (2016.01) |
| *G06F 12/0871* | (2016.01) |
| *G06F 17/30* | (2006.01) |
| *G06F 3/06* | (2006.01) |
| *H04L 29/06* | (2006.01) |

(52) U.S. Cl.
CPC ........ *G06F 12/0891* (2013.01); *G06F 3/0661* (2013.01); *G06F 3/067* (2013.01); *G06F 12/0871* (2013.01); *G06F 17/302* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 6,470,360 B1 * | 10/2002 | Vaitheeswaran | |
| 6,792,435 B1 * | 9/2004 | Ruddy | G06F 11/1471 |
| 7,139,892 B2 * | 11/2006 | Peinado et al. | 711/163 |
| 8,756,338 B1 * | 6/2014 | Potakamuri | G06F 3/061 |
| | | | 709/202 |
| 8,972,405 B1 | 3/2015 | Chaulk et al. | |
| 9,122,688 B1 | 9/2015 | Palanki | |
| 9,158,729 B1 | 10/2015 | Joyce et al. | |
| 9,460,304 B1 | 10/2016 | Tsai et al. | |
| 9,652,434 B1 | 5/2017 | Chen et al. | |
| 2003/0097539 A1 * | 5/2003 | Hagersten | G06F 11/0712 |
| | | | 711/203 |
| 2006/0184613 A1 * | 8/2006 | Stienessen et al. | 709/203 |
| 2008/0172480 A1 * | 7/2008 | Agrawal | H04L 67/1097 |
| | | | 709/221 |
| 2008/0270480 A1 * | 10/2008 | Hanes | G06F 17/30117 |
| 2010/0125588 A1 * | 5/2010 | Mehra et al. | 707/754 |

(Continued)

*Primary Examiner* — Jared Rutz
*Assistant Examiner* — Stephanie Wu
(74) *Attorney, Agent, or Firm* — BainwoodHuang

(57) ABSTRACT

The subject disclosure is generally directed towards caching property values in a sparse cache for use in translating notifications to contain property values related to a source instance, e.g., for use in SMI-S compliant notifications (deletion indications). When a deletion indication translation needs properties that are unavailable in the current source instance, a cache is accessed to obtain the previous related property values. The deletion indication is translated based upon the related property values, and output, e.g., as a translated deletion indication to a client subscriber.

20 Claims, 5 Drawing Sheets

(56) References Cited

U.S. PATENT DOCUMENTS

| | | | |
|---|---|---|---|
| 2010/0153652 A1* | 6/2010 | Thomas | G06F 12/0866 711/136 |
| 2012/0117105 A1* | 5/2012 | Thomas | G06F 17/30348 707/769 |
| 2012/0198174 A1* | 8/2012 | Nellans | G06F 12/0804 711/133 |
| 2013/0031308 A1* | 1/2013 | De Spiegeleer et al. | 711/122 |
| 2014/0344327 A1* | 11/2014 | Lovric et al. | 709/203 |

* cited by examiner

DELETION INDICATION IMPLEMENTATION BASED ON INTERNAL MODEL

BACKGROUND

The Storage Management Initiative Specification (SMI-S) provides a standard for information technology (IT) clients to follow when managing the storage devices and the like of any SMI-S compliant storage vendors. Among its many requirements, the SMI-S standard specifies some notifications when a resource is deleted (deletion indications). That is, the SMI-S standard specifies mandatory deletion indication filters on specific classes be supported.

However, when a resource deletion occurs, not all of the information (e.g., certain property values) that may need to be returned with the deletion indication remains available at the underlying framework that provides the deletion indication. By way of example, when a deletion indication arrives from the framework, some values needed by SMI-S for the deletion indication may be unavailable and the framework only provide key properties of the corresponding instance in SourceInstance. As a more particular example, when a framework deletion indication on a host instance is provided, its property Type (Host, Subnet or Netgroup) that tells whether it corresponded to a CIM_SCSIProtocolController instance is not in SourceInstance. This related property value set (one or more property values) cannot be obtained from the framework because of a result of the deletion, it is no longer available at the framework.

Redesigning and implementing the framework to provide all properties in underlying indication is possible, but would take an extremely significant amount of effort, and would be very risky with respect to being likely to introduce regressions. Another solution is to have a full cache containing all of the possibly needed information, and then use a polling thread to (periodically) detect the change by comparison against the current data. Such a solution is highly inefficient in performance, including in terms of memory and CPU usage, particularly when the number of instances is on the order of tens of thousands.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing deletion indications to client subscribers that include related previous property (alternatively referred to as attribute or data) values. The technology is generally based upon lightweight caching configured on top of legacy components that are incapable of providing the related previous attribute values.

In one or more aspects, a sparse cache is maintained by the SMI-S API layer for the related previous attribute values. When an original deletion indication containing the source attribute value is received for sending to client subscribers, the related previous value is obtained from the cache, and the deletion indication is translated according to the related previous property value before sending to the client subscribers. The related previous property value is then deleted from the cache as its corresponding resource has been deleted.

It should be understood that any of the examples herein are non-limiting. For instance, one or more examples used herein show the SMI-S layer containing the deletion handling logic and the sparse cache, however these components may be external to the layer and communicate with/be accessed by the SMI-S layer. Also, the properties/attributes described herein as being cached and used in deletion indications may vary from those described, be extended and so forth. Moreover SMI-S is only one scenario that may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and notification communication in general.

Figure 1:
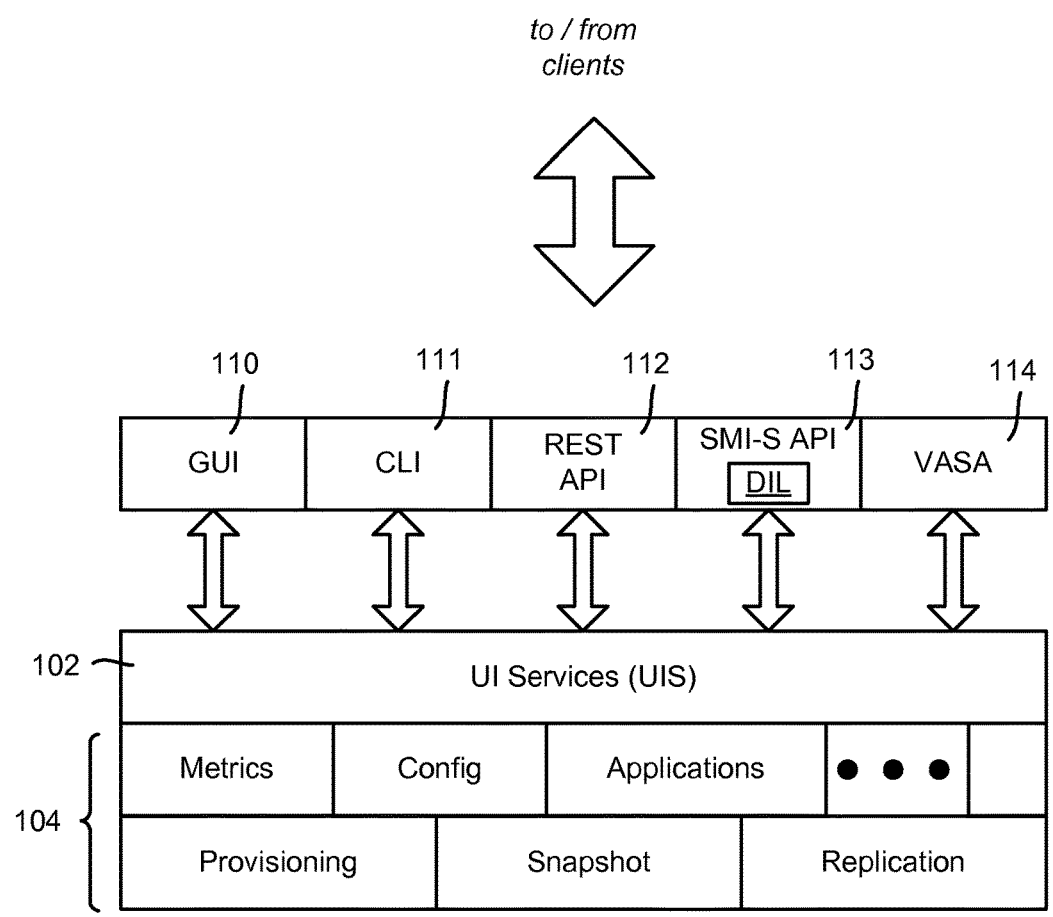
FIG. 1 is a block diagram showing an example layered configuration of various example components that may be used to provide SMI-S compliant notifications, according to one or more example embodiments.

FIG. 1 shows a block diagram of a layered framework that includes UI services 102 (UIS) for connecting with underlying storage-related technology (with some example components/modules and the like collectively labeled 104 in FIG. 1). For example, server hardware and/or software, including storage, may be represented by the layer or layers labeled 104 in FIG. 1.

Example layers (wrappers) for interfacing clients to the UI services 102 include a graphical user interface layer 110, a command Line Interface layer 111, a REST API layer 112, and SMI-S API layer 113 and a VASA (vSphere APIs for Storage Awareness) layer 114. As can be readily appreciated, these are examples, and not all such layers need be present or more may be present in a given implementation.

Figure 2:
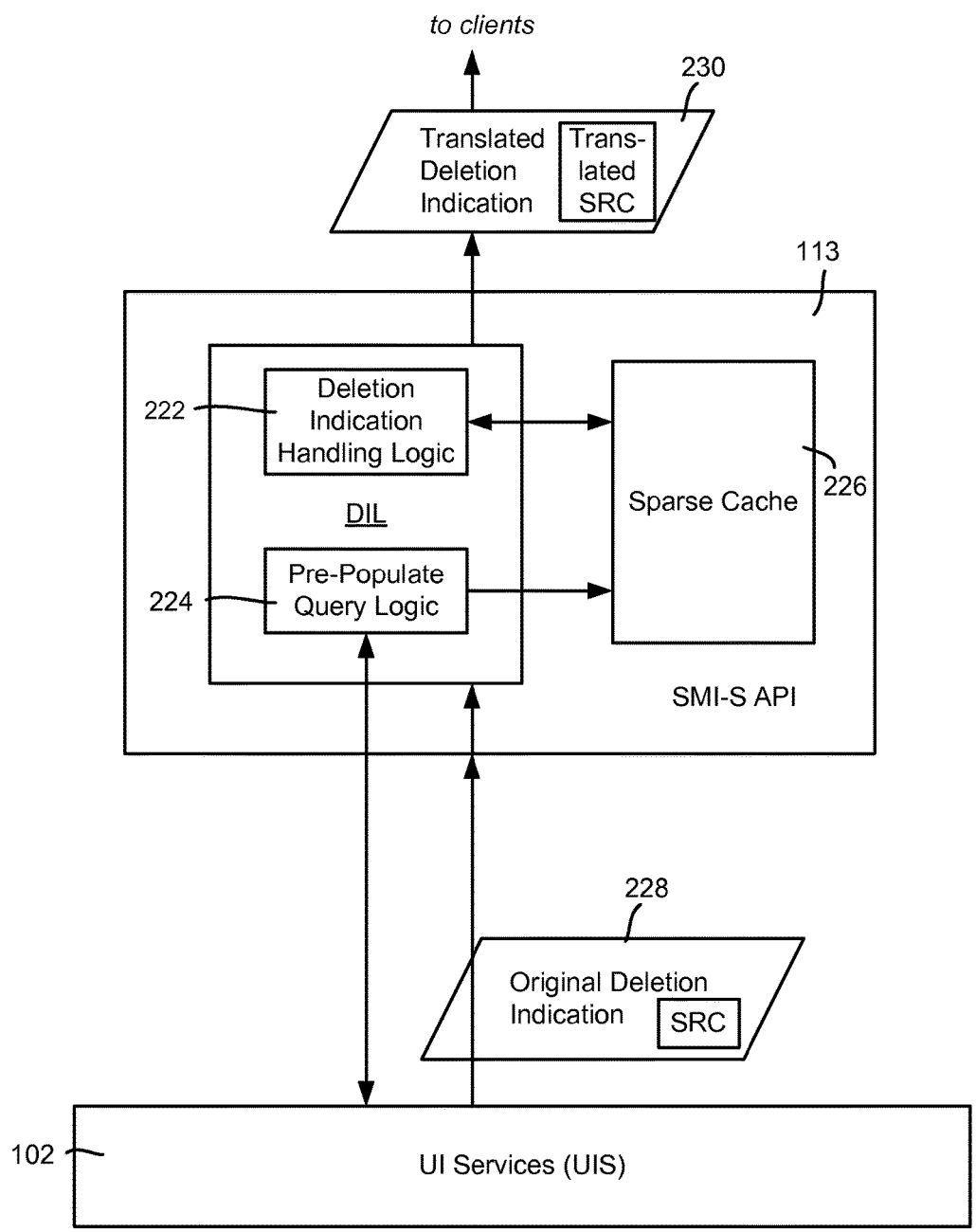
FIG. 2 is a block diagram showing example logic that may be used to translate a deletion indication into a translated deletion indication containing a source value and related previous property value, according to one or more example embodiments.

As shown in FIG. 1 and exemplified in more detail in FIG. 1, in one or more embodiments the SMI-S API layer 113 contains deletion implementation logic (DIL) components or the like as described herein. In FIG. 2, this is shown as deletion indication handling logic 222 and pre-populate query logic 224, along with a sparse cache 226.

In general, when the system starts up, the pre-populate query logic 224 queries the UI services 102 to obtain the current property values for those in which the related previous property value needs to be used by certain deletion indications. That is, SMI-S only defines a limited number of indication filters (part of attributes of some classes):

| SMIS Object | Type | SMI-S Indication Filters |
|---|---|---|
| CIM_ComputerSystem | New | SELECT * FROM CIM_InstCreation WHERE SourceInstance ISA CIM_ComputerSystem |
| | New | SELECT * FROM CIM_InstCreation WHERE Source Instance ISA CIM_Computer_System AND ANY SourceInstance.CIM_ComputerSystem::Dedicated[*] = 16 |
| | Modify | SELECT * FROM CIM_InstModification WHERE SourceInstance ISA CIM_ComputerSystem AND SourceInstance.CIM_ComputerSystem::OperationalStatus <> PreviousInstance.CIM_ComputerSystem::OperationalStatus |
| | Delete | SELECT * FROM CIM_InstDeletion WHERE SourceInstance ISA CIM_ComputerSystem |
| | Delete | SELECT * FROM CIM_InstDeletion WHERE SourceInstance ISA CIM_ComputerSystem AND ANY SourceInstance.CIM_ComputerSystem::Dedicated[*] = 16 |
| CIM_RedundancySet | Modify | SELECT * FROM CIM_InstModification WHERE SourceInstance ISA CIM_RedundancySet AND SourceInstance.CIM_RedundancySet::RedundancyStatus <> PreviousInstance.CIM_RedundancySet:RedundancyStatus |
| CIM_StoragePool (Concrete Storage Pool) | New | SELECT * FROM CIM_InstCreation WHERE SourceInstance ISA CIM_StoragePool |
| | Modify | SELECT * FROM CIM_InstModification WHERE SourceInstance ISA CIM_StoragePool AND SourceInstance.CIM_StoragePool::TotalManagedSpace <> PreviousInstance.CIM_StoragePool::TotalManagedSpace |
| | Delete | SELECT * FROM CIM_InstDeletion WHERE SourceInstance ISA CIM_StoragePool |
| CIM_StorageVolume | New | SELECT * FROM CIM_InstCreation WHERE SourceInstance ISA CIM_StorageVolume |
| | Modify | SELECT * FROM CIM_InstModification WHERE SourceInstance ISA CIM_StorageVolume AND SourceInstance.CIM_StorageVolume::OperationalStatus <> PreviousInstance.CIM_StorageVolume::OperationalStatus |
| | Delete | SELECT * FROM CIM_InstDeletion WHERE SourceInstance ISA CIM_StorageVolume |
| CIM_LogicalDisk | New | SELECT * FROM CIM_InstCreation WHERE SourceInstance ISA CIM_LogicalDisk |
| | Modify | SELECT * FROM CIM_InstModification WHERE SourceInstance ISA CIM_LogicalDisk AND SourceInstance.CIM_LogicalDisk::OperationalStatus <> PreviousInstance.CIM_LogicalDisk::OperationalStatus |
| | Delete | SELECT * FROM CIM_InstDeletion WHERE SourceInstance ISA CIM_LogicalDisk |
| CIM_StorageSynchronized | New | SELECT * FROM CIM_InstCreation WHERE SourceInstance ISA CIM_StorageSynchronized |
| | Delete | SELECT * FROM CIM_InstDeletion WHERE SourceInstance ISA CIM_StorageSynchronized |
| CIM_DiskDrive | New | SELECT * FROM CIM_InstCreation WHERE SourceInstance ISA CIM_DiskDrive |
| | Delete | SELECT * FROM CIM_InstDeletion WHERE SourceInstance ISA CIM_DiskDrive |
| CIM_AssociatedPrivilege | New | SELECT * FROM CIM_InstCreation WHERE SourceInstance ISA CIM_AssociatedPrivilege |
| | Delete | SELECT * FROM CIM_InstDeletion WHERE SourceInstance ISA CIM_AssociatedPrivilege |
| CIM_AuthorizedSubject | New | SELECT * FROM CIM_InstCreation WHERE SourceInstance ISA CIM_AuthorizedSubject |
| | Delete | SELECT * FROM CIM_InstDeletion WHERE SourceInstance ISA CIM_AuthorizedSubject |
| CIM_ProtocolController | New | SELECT * FROM CIM_InstCreation WHERE SourceInstance ISA CIM_ProtocolController |
| | Delete | SELECT * FROM CIM_InstDeletion WHERE SourceInstance ISA CIM_ProtocolController |
| CIM_ProtocolControllerForUnit | New | SELECT * FROM CIM_InstCreation WHERE SourceInstance ISA CIM_ProtocolControllerForUnit |
| | Modify | SELECT * FROM CIM_InstModification WHERE SourceInstance ISA CIM_ProtocolControllerForUnit |
| | Delete | SELECT * FROM CIM_InstDeletion WHERE SourceInstance ISA CIM_ProtocolControllerForUnit |
| CIM_FCPort | New | SELECT * FROM CIM_InstCreation WHERE SourceInstance ISA CIM_FCPort |
| | Modify | SELECT * FROM CIM_InstModification WHERE SourceInstance ISA CIM_FCPort AND SourceInstance.CIM_FCPort:OperationalStatus <> PreviousInstance.CIM_FCPort::OperationalStatus |
| | Delete | SELECT * FROM CIM_InstDeletion WHERE SourceInstance ISA CIM_FCPort |
| CIM_iSCSIProtocolEndpoint | New | SELECT * FROM CIM_InstCreation WHERE SourceInstance ISA CIM_iSCSIProtocolEndpoint |
| | Delete | SELECT * FROM CIM_InstDeletion WHERE SourceInstance ISA CIM_iSCSIProtocolEndpoint |
| CIM_SCSIProtocolController | New | SELECT * FROM CIM_InstCreation WHERE SourceInstance ISA CIM_SCSIProtocolController |
| | Delete | SELECT * FROM CIM_InstDeletion WHERE SourceInstance ISA CIM_SCSIProtocolController |
| CIM_LogicalDevice | Modify | SELECT * FROM CIM_InstModification WHERE SourceInstance ISA CIM_LogicalDevice AND SourceInstance.CIM_LogicalDevice::HealthState <> PreviousInstance.CIM_LogicalDevice::HealthState |
| CIM_ConcreteJob | Create | SELECT * FROM CIM_InstCreation WHERE SourceInstance ISA CIM_ConcreteJob |

-continued

| SMIS Object | Type | SMI-S Indication Filters |
|---|---|---|
| | Modify | SELECT * FROM CIM_InstModification WHERE SourceInstance ISA CIM_ConcreteJob AND SourceInstance.CIM_ConcreteJob::PercentComplete <> PreviousInstance.CIM_ConcreteJob::PercentComplete |
| | Modify | SELECT * FROM CIM_InstModification WHERE SourceInstance ISA CIM_ConcreteJob AND ANY SourceInstance.CIM_ConcreteJob::OperationalStatus[*] = 17 AND ANY SourceInstance.CIM_ConcreteJob::OperationalStatus[*] = 2 |
| | Modify | SELECT * FROM CIM_InstModification WHERE SourceInstance ISA CIM_ConcreteJob AND ANY SourceInstance.CIM_ConcreteJob::OperationalStatus[*] = 17 AND ANY SourceInstance.CIM_ConcreteJob::OperationalStatus[*] = 6 |
| | Modify | SELECT * FROM CIM_InstModification WHERE SourceInstance ISA CIM_ConcreteJob AND SourceInstance.CIM_ConcreteJob::JobState <> PreviousInstance.CIM_ConcreteJob::JobState |
| CIM_FileShare | New | SELECT * FROM CIM_InstCreation WHERE SourceInstance ISA CIM_FileShare |
| | Delete | SELECT * FROM CIM_InstDeletion WHERE SourceInstance ISA CIM_FileShare |
| SNIA_LocalFileSystem | Create | SELECT * FROM CIM_InstCreation WHERE SourceInstance ISA SNIA_LocalFileSystem |
| | Modify | SELECT * FROM CIM_InstModification WHERE SourceInstance ISA SNIA_LocalFileSystem |

The following are properties that may be cached for a deletion indication implementation:
  UIS_UEM_Disk::DriveType
  UIS_UEM_Disk::OperationalStatus
  UIS_UEM_Disk::FriendlyID
  UIS_UEM_Disk::StoragePoolID
  UIS_UEM_MappedStoragePool::FriendlyID
  UIS_UEM_MappedStoragePool::RemainingSpace
  UIS_UEM_MappedStoragePool::OperationalStatus
  UIS_StorageProcessor::FriendlyID
  VNXe_PrimordialPoolLeaf::FriendlyID
  UIS_UEM_VolumeSnap::FriendlyID
  UIS_UEM_SnapGroup::FriendlyID
  UIS_UEM_FileSystem::FriendlyID
  UIS_UEM_StorageVolume::FriendlyID
  UIS_HostInitiaton:FriendlyID
  UIS_Host::FriendlyID
  UIS_HostVolume::Type
  UIS_Host::Type
  UIS_UemJob::FriendlyID
  UIS_FibreChannelPort::FriendlyID
  UIS_ISCSINode::ISCSIName
  UIS_ISCSINode::FriendlyID
  UIS_EthernetPort::FriendlyID
  UIS_UEM_CIFSServer::NetbiosName
  UIS_UEM_NFSServer::FriendlyID
  UIS_NFSShare::FriendlyID
  UIS_CIFSShare::FriendlyID As can be seen, certain resource-related property values, such as drive type data, operational status data, friendly identifier (ID) data, storage pool identifier data, remaining space data, type data, ISCSI name data and Netbios name data, are cached at startup because they are otherwise lost by the underlying framework upon a deletion of their corresponding resource. After startup, the cache is also populated during system operation upon instance creation.

Indications in SMI-S are used to model events, to which SMI-S clients may subscribe using an indication filter. In general, an SMI-S server sends an indication to notify the client when the subscribed event occurs.

As described herein, for certain properties, the UIS Layer 102 can only send a deletion notification with SourceInstance with only key properties. This is represented in FIG. 2 by the original deletion indication including a "SRC" property value. Through a combination of sparse caching and indication translation, the related previous data is used during the indication translation 230. This is shown in FIG. 2 in which the deletion indication handling logic 222 accesses the sparse cache 226 (e.g., a lookup table/key value pair) for the appropriate value. Once no longer needed, e.g., when sent to the client subscribers, the deletion indication handling logic 222 also accesses the sparse cache 226 to delete the corresponding cached data value or values.

Figure 3:
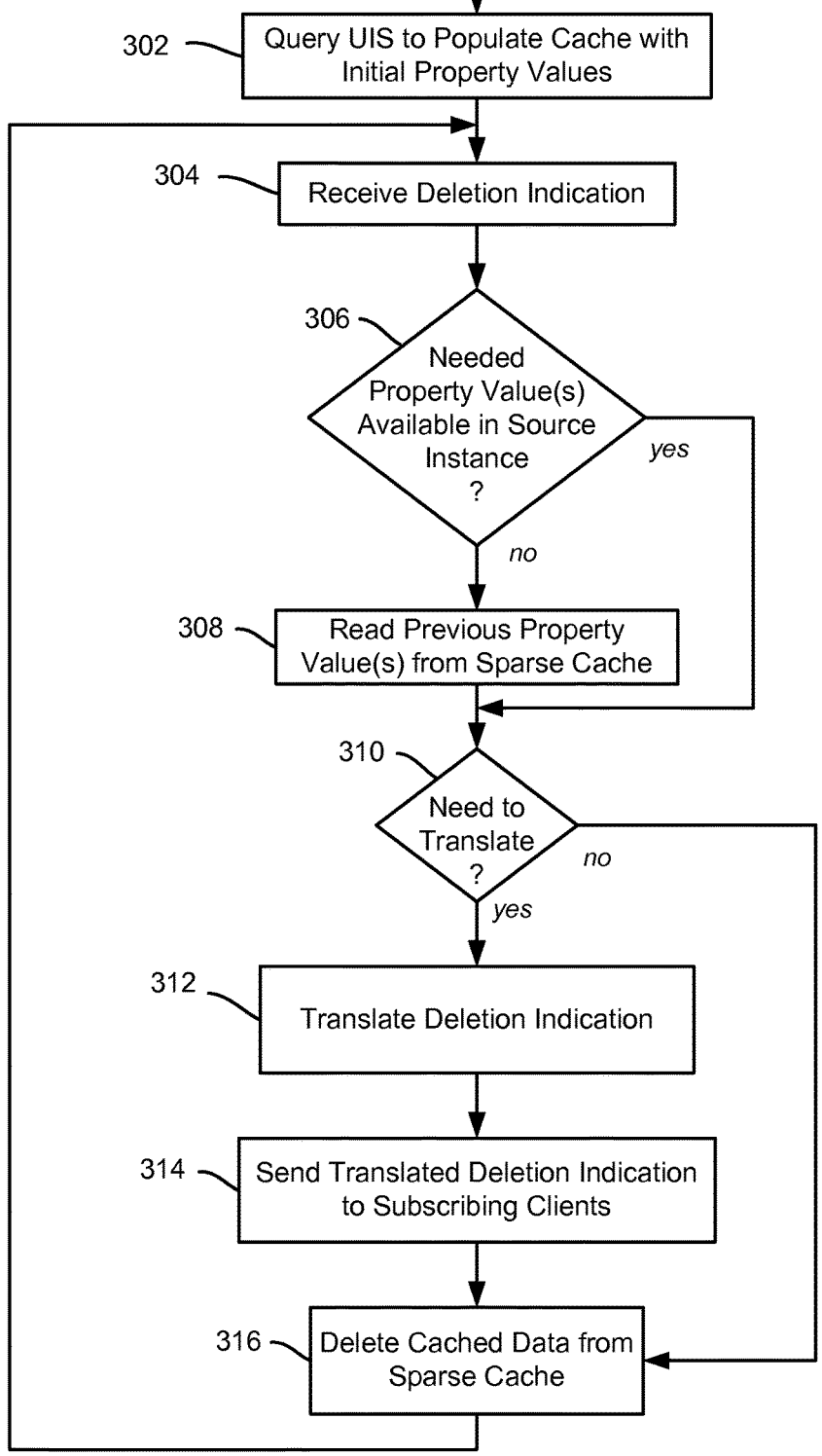
FIG. 3 is a flow diagram showing example steps that may be taken to obtain and generate a translated deletion indication, according to one or more example embodiments.

FIG. 3 summarizes these aspects in the form of example steps of a flow diagram. Step 302 represents the SMI-S deletion implementation logic caching the initial related property values in anticipation of their being needed by SMI-S deletion indication filters in the event of a future deletion. Note that in FIG. 3 and throughout, the terms "property value(s)" or "related property value(s)" refers to a set of one or more property values as needed to comply with the deletion indication, whether a single property value or a set of two or more property values.

Later, when a UIS deletion indication is sent from the UIS layer and received by the SMI-S layer implementation (step 304), the deletion indication handling logic 222 is able to apply the cached value or values if needed. Step 306 represents evaluated whether the source instance already has the needed information to comply with the SMI-S deletion indication. If not, step 308 reads the needed value(s) from the sparse cache.

Step 310 represents determining whether translation is needed; note that the decision may be based upon some of the cached property values that were read at step 308. If so, step 312 performs the translation, e.g., includes the cached value(s) in the translated deletion indication, and step 314 sends the translated deletion indication to the subscribing clients so as to send an SMI-S compliant deletion indication. At step 316, the SMI-S implementation also deletes the value(s) in the cache, if any were cached for this resource.

Note that only some deletion indications may need such a previous property value set; for others that do not, step 306 is exemplified as skipping the cache lookup at step 308.

Figure 4:
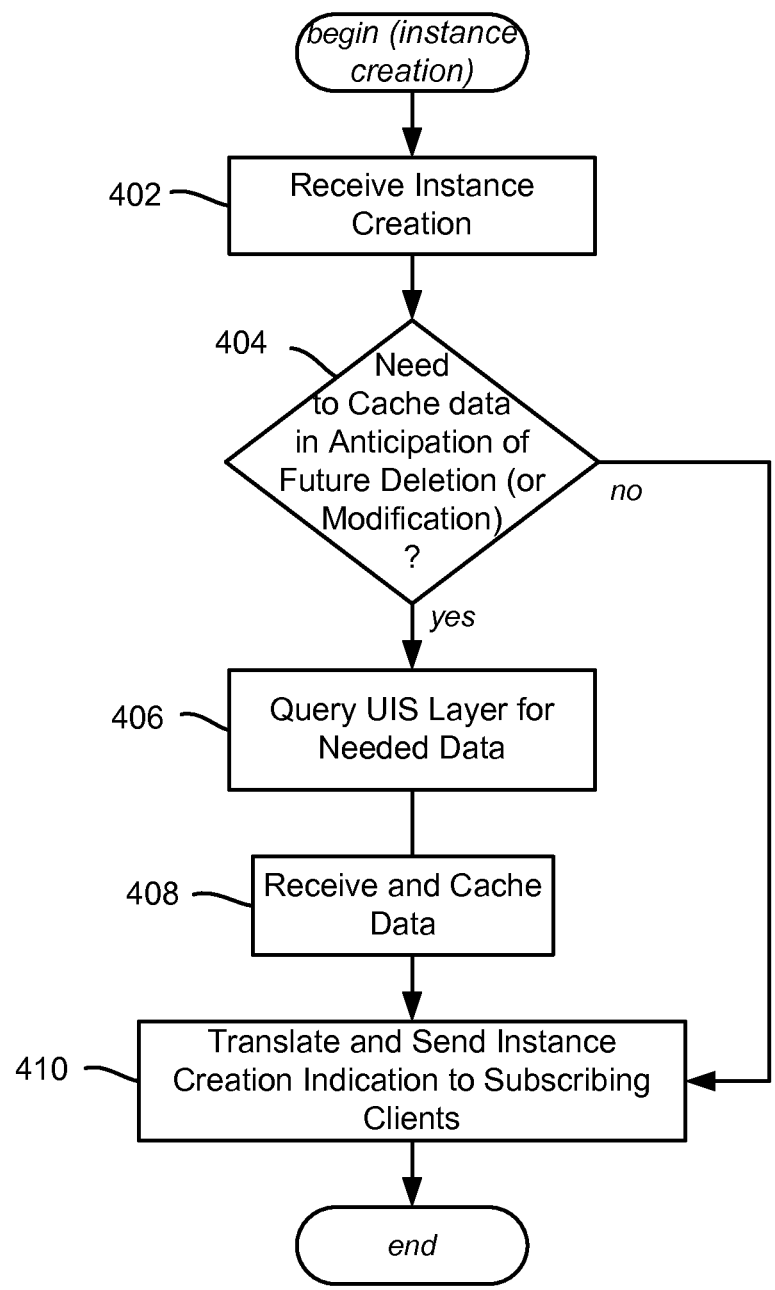
FIG. 4 is a flow diagram showing example steps that may be taken to update a cache upon instance creation in anticipation of future need for a property value, according to one or more example embodiments.

FIG. 4 exemplifies the cache updating at the time of an instance creation in the form of example steps of a flow diagram. At step 402, the instance creation is received.

Step 404 determines whether the corresponding resource has a property that needs to be cached in the event of a later deletion (or a modification). If so, steps 406 and 408 query for, receive and cache the needed data; (later, if a deletion occurs that corresponds to this created instance, the needed data are cached for the deletion indication). Otherwise these steps need not be performed. Step 410 translates and sends the instance creation as a notification to the subscribing clients.

As can be seen, no redesign is needed in components below the SMI-S layer, avoiding the significant effort and risks of any such redesign. This also facilitates isolation between SMI-S layer and existing components.

At the same time, only the needed values are cached, which is efficient in terms of memory/storage usage. No periodic full polling is needed, which is efficient in terms of CPU usage.

Example Computing Device

The techniques described herein can be applied to any device or set of devices capable of running programs and processes, such as the any of the layered components of FIG. 1. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
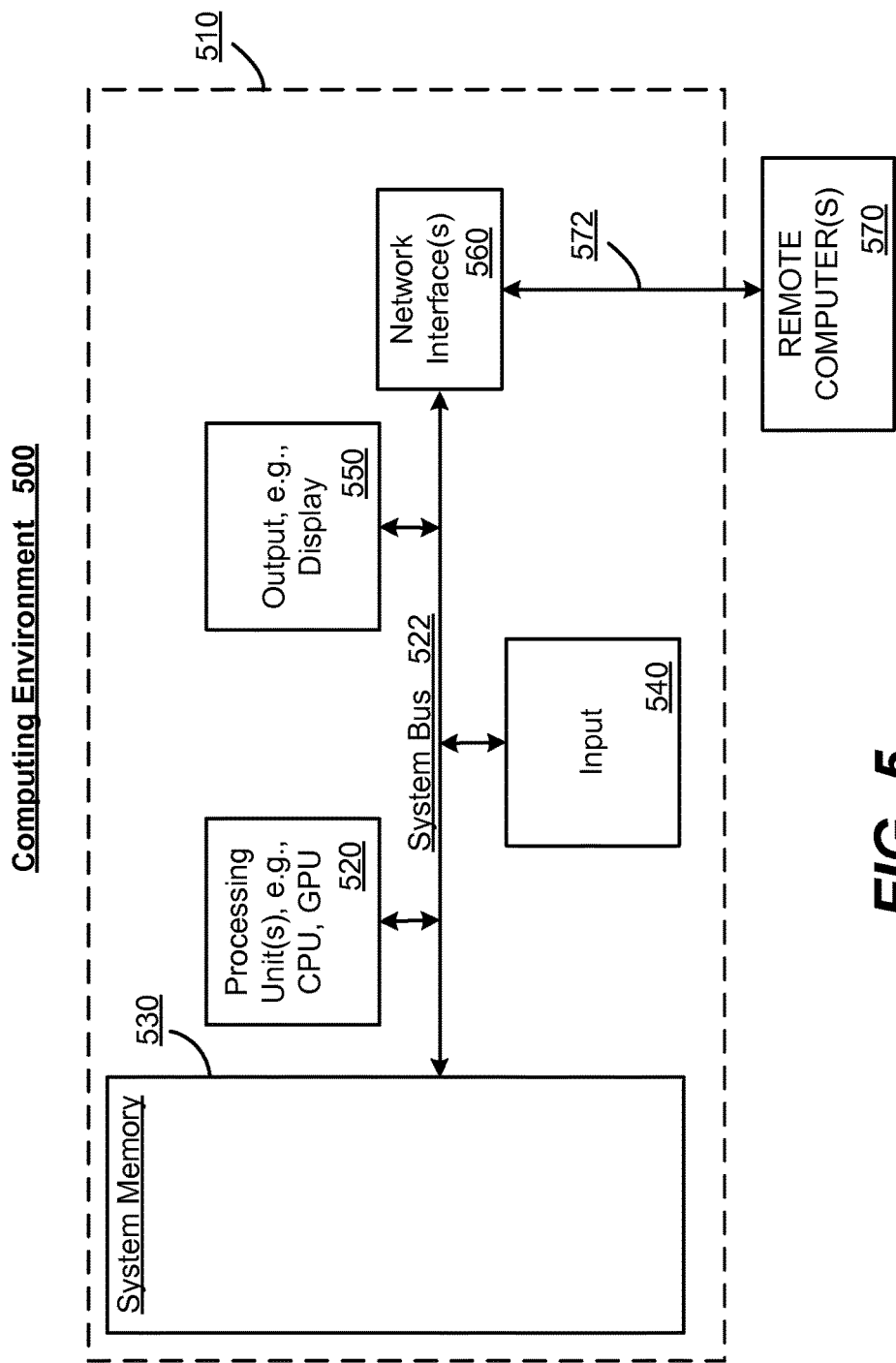
FIG. 5 is a block diagram representing an example computing environment into which aspects of the subject matter described herein may be incorporated.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the example computing system environment 500.

With reference to FIG. 5, an example device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of machine/computer-readable media and can be any available media that can be accessed by computer 510. The system memory 530 may include computer storage media in the form of volatile and/or nonvolatile memory such as read only memory (ROM) and/or random access memory (RAM), and hard drive media, optical storage media, flash media, and so forth. By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
on determining a previous property value corresponding to a resource is required for translation of a deletion indication in an event of a future deletion or modification of the resource, caching an initial property value corresponding to the resource, the cached initial property value is the previous property value to be utilized for translation of a future deletion indication to a storage management initiative specification (SMI-S) compliant deletion indication;
receiving an original deletion indication from a server upon deletion of the resource, the original deletion indication comprising a current source instance, the current source instance comprising a source value, the previous property value is not included in the current source instance;
obtaining the previous property value from the cache;
translating, by one or more processors, the original deletion indication into a translated deletion indication, the translated deletion indication is compatible with the SMI-S based upon the previous property value and the source value, the translated deletion indication comprising the previous property value and the source value; and
outputting the translated deletion indication to a client to notify the client of the deletion of the resource.

2. The method of claim 1, further comprising:
on outputting the translated deletion indication to the client, deleting the previous property value for the property from the cache.

3. The method of claim 1, further comprising:
determining that the original deletion indication corresponds to an indication for which the previous property value in the cache is maintained, wherein the cache is a sparse cache maintained by an SMI-S application programming interface (API) layer;
obtaining the previous property value from the sparse cache; and
performing translation of the original deletion indication into the translated deletion indication according to the previous property value.

4. The method of claim 1, wherein outputting the translated deletion indication to the client further comprises:
sending the translated deletion indication to a plurality of client subscribers.

5. The method of claim 1, further comprising:
populating the cache with a set of initial property values during system startup, the set of initial property values comprising the previous property value.

6. The method of claim 5, wherein populating the cache further comprises:
querying a user interface (UI) services for the set of initial property values; and
caching the set of initial property values in a sparse cache.

7. The method of claim 1, further comprising:
receiving an instance creation notification, querying a UI services to obtain the initial property value related to the instance, receiving the initial property value, and populating the cache with the initial property value.

8. The method of claim 1, wherein receiving the original deletion indication comprises:
communicating with a services layer for connecting with underlying storage-related components associated with the server; and
receiving the original deletion indication by a SMI-S layer.

9. A system comprising:
one or more processors; and
a memory, the memory configured to include deletion implementation logic, the deletion implementation logic including deletion indication handling logic to translate an original deletion indication received from a server upon deletion of a resource, in which the original deletion indication contains a source instance, the one or more processors executing the deletion indication handling logic to read a sparse cache containing one or more related previous property values corresponding to the source instance, obtain the one or more related previous property values from the sparse cache; translate the original deletion indication into a storage management initiative specification (SMI-S) compliant translated deletion indication based on the cached one or more previous property values and a value or values in the source instance; and send the translated deletion indication to at least one subscribing client to notify the at least one subscribing client of the deletion of the resource, a previous property value in the one or more related previous property values comprising a resource-related property value that is not included in the source instance from the server providing the original deletion indication upon deletion of the resource, the translated deletion indication comprising the one or more related previous property values.

10. The system of claim 9, wherein at least part of the deletion implementation logic is incorporated into or coupled to a SMI-S application programming interface (API) layer.

11. The system of claim 10, wherein the SMI-S API layer receives the deletion indication from the server via a services layer for connecting with underlying storage-related components.

12. The system of claim 10, wherein the SMI-S API layer is configured to send the translated deletion indication to the at least one subscribing client.

13. The system of claim 9, wherein the previous property value corresponds to at least one of: drive type data, operational status data, friendly identifier data, storage pool identifier data, remaining space data, type data, ISCSI name data, or Netbios name data.

14. The system of claim 9, wherein the deletion implementation logic further comprises:
logic configured to pre-populate the sparse cache.

15. The system of claim 9, wherein the deletion implementation logic further comprises:
logic configured to update the sparse cache based upon instance creation.

16. The system of claim 9, wherein the deletion implementation logic further comprises:
logic configured to remove the previous property value from the sparse cache.

17. One or more non-transitory machine-readable storage media having machine-executable instructions, which when executed perform steps, comprising: receiving an original deletion indication upon deletion of a resource, the original deletion indication comprising a source instance, the source instance comprising zero or more properties; determining whether one or more previous related property values corresponding to a resource are needed for translation of the original deletion indication into a storage management initiative specification (SMI-S) compliant deletion indication, and if so: (i) accessing cached data to read the one or more previous related property values that correspond to the source instance, a previous property value in the one or more previous related property values comprising a resource related property value that is not included in the source instance; (ii) translating the original deletion indication into a translated deletion indication based upon the one or more previous related property values, the translated deletion indication is compatible with the SMI-S, the translated deletion indication comprising the one or more previous related property values corresponding to the source instance; and (iii) outputting the translated deletion indication to one or more clients to notify the one or more clients of the deletion of the resource.

18. The non-transitory machine-readable storage media of claim 17 having further machine-executable instructions comprising: on outputting the translated deletion indication to a client, deleting the previous value for the property from a cache.

19. The non-transitory machine-readable storage media of claim 17 having further machine-executable instructions comprising: populating a cache with one or more related property values based upon an instance creation in anticipation of a future deletion.

20. The non-transitory machine-readable storage media of claim 17 having further machine-executable instruction comprising: outputting a non-translated deletion indication upon determining that the one or more previous related property values are not needed for the original deletion indication.

* * * * *